UNITED STATES PATENT OFFICE.

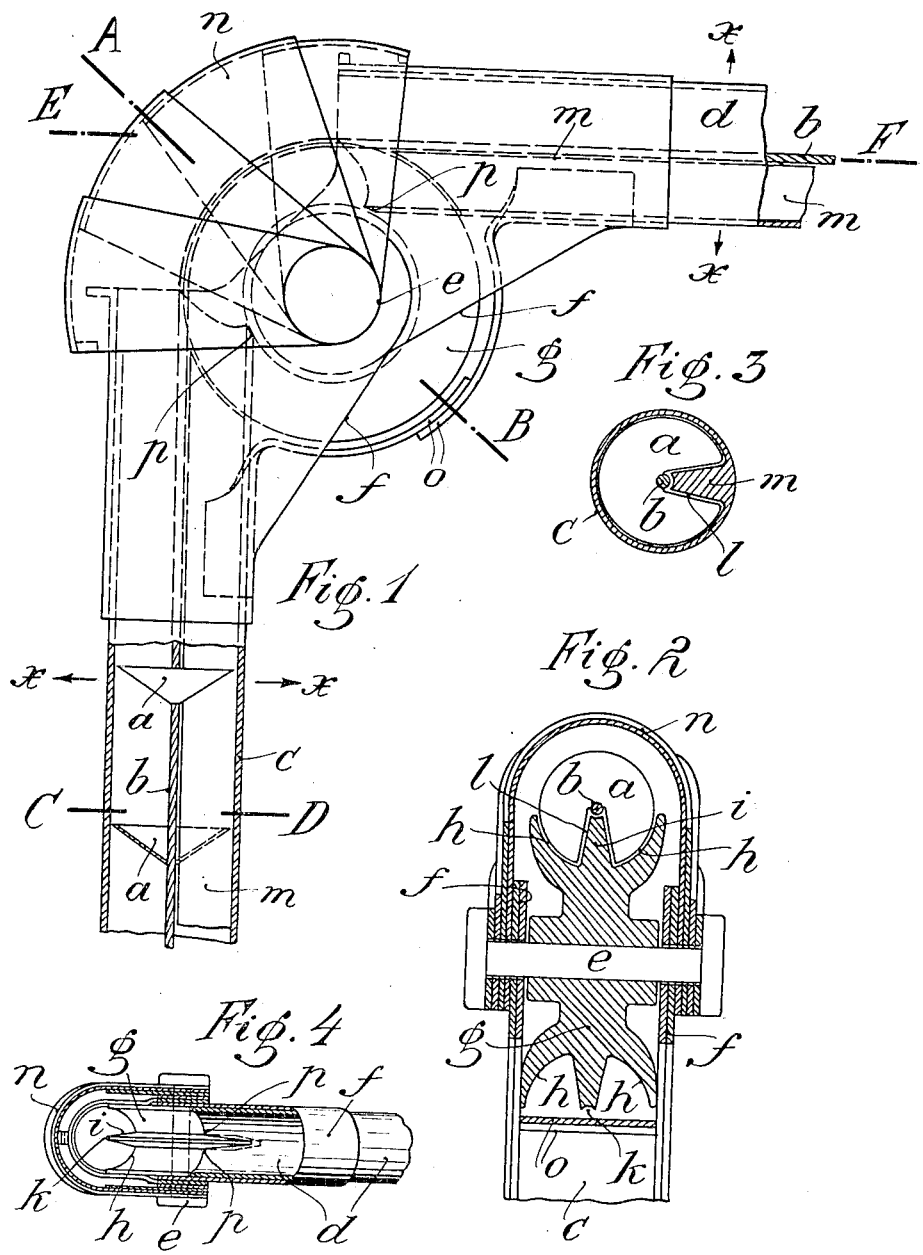

HANS ZUBLIN, OF BUENOS AIRES, ARGENTINA.

BUCKET CONVEYER.

1,117,939. Specification of Letters Patent. Patented Nov. 17, 1914.

Application filed May 12, 1914. Serial No. 838,010.

*To all whom it may concern:*

Be it known that I, HANS ZUBLIN, a citizen of Switzerland, residing at Buenos Aires, Argentina, have invented certain new and useful Improvements in Bucket Conveyers; and I do hereby declare the following to be a full, clear, and exact description of the invention, such as will enable others skilled in the art to which it appertains to make and use the same.

The object of this invention is to provide improved means whereby a series of buckets, carried by a cable and traveling through pipes, is taken around a bend or elbow at a variable angle.

The invention is illustrated in the accompanying drawing, in which—

Figure 1 is a side view, partly in section, Figs. 2, 3 and 4 being sections on the lines A—B, C—D and E—F respectively.

The buckets or scrapers $a$ are fixed in series to a rope $b$, which at that part of the conveyer which is shown in the drawing travels through two pipe sections $c$, $d$, hinged to each other at $e$ by a joint $f$, so that they can be rocked as indicated by the arrows $x$, to alter the angle at which the two sections are set, or to place them in a straight line. On the pivot $e$ is mounted a grooved guide wheel $g$, for which a sprocket wheel may be substituted if a chain is used instead of the rope $b$.

In order that the wheel need not be of inconveniently large diameter, even if the conveyer is working at high speed, the wheel has around its circumference a rib or flange $i$ on which the rope or chain rests, the buckets $a$ having slots $l$ enabling them to pass the said rib, as shown in Figs. 2 and 3. The wheel $g$ has curved side flanges $h$, so that its circumference forms an annular trough with the rib $i$ at the center, and the buckets $a$ are partly sunk in this trough while traveling on the wheel. In cross section the trough conforms to the adjacent parts of the pipes $c$ and $d$, which enter the trough approximately tangentially with the base thereof, the rims of the pipe mouths abutting against the wheel at $p$, $p$. The trough thus forms a channel connecting the two pipes. The buckets are guided in the pipes so that their slots $l$ run cleanly on to the rib $i$, and off same, without jarring. For this purpose there is in each pipe a rib $m$, alined with the rib $i$ and of the same height, or of a somewhat less height.

The guide wheels or rollers at the ends of the conveyer, or where load is taken up and discharged, must of course also have ribs which enter the slots $l$, but they need not have the channeled or trough like shape shown in Fig. 2. The bend or elbow of the conveyer shown in Fig. 1 is protected by a collapsible or foldable guard $n$, to prevent any part of the load from being thrown out by centrifugal force at this part. The two pipes $c$ and $d$ are provided with curved overlapping tongues $o$ extending around part of the circumference of the wheel, and forming a guard inside the elbow or bend.

What I claim as my invention and desire to secure by Letters Patent of the United States is:—

1. In a bucket conveyer the combination of two pipes, a hinge joint connecting said pipes end to end, a wheel concentric with the axis of said joint, a cable in said pipes traveling on said wheel, and buckets fixed to said cable, having slots enabling them to travel with said cable around said wheel.

2. In a bucket conveyer the combination of two pipes, a hinge joint connecting said pipes end to end, a wheel concentric with the axis of said joint, having a rib formed on its circumference, a cable in said pipes traveling on said rib, and buckets fixed to said cable, having slots enabling them to travel with said cable around said wheel.

3. In a bucket conveyer the combination of two pipes, a hinge joint connecting said pipes end to end, a wheel concentric with the axis of said joint, having a channel formed in its periphery, a rib formed in said channel around said wheel, a cable in said pipes traveling on said rib, and buckets fixed to said cable having slots enabling them to travel with said cable around said wheel.

4. In a bucket conveyer the combination of two pipes, a hinge joint connecting said pipes end to end, a wheel concentric with the axis of said joint, having a channel formed in its periphery, said pipes projecting into said channel approximately tangentially of its base, a rib formed in said channel around said wheel, a cable in said pipes traveling on said rib, and buckets fixed to said cable having slots enabling them to travel with said cable around said wheel.

5. In a bucket conveyer the combination of two pipes, a hinge joint connecting said pipes end to end, a wheel concentric with the axis of said joint, having a channel formed in its periphery, a rib formed in said channel around said wheel, a cable in said pipes traveling on said rib, buckets fixed to said cable having slots enabling them to travel with said cable around said wheel, and ribs in said pipes, engaged with said slotted buckets, guiding the latter to the rib on said wheel.

In testimony whereof I hereunto affix my signature in the presence of two witnesses.

HANS ZUBLIN.

Witnesses:
ERNST MARQUARDT,
WILHELM MARQUARDT.